United States Patent
Barrows et al.

(10) Patent No.: US 10,637,919 B2
(45) Date of Patent: Apr. 28, 2020

(54) AUTONOMOUS RESOURCE GOVERNOR IN DISTRIBUTED SYSTEMS FOR PROTECTING SHARED RESOURCES

(71) Applicant: MICROSOFT TECHNOLOGY LICENSING, LLC, Redmond, WA (US)

(72) Inventors: Bradley J. Barrows, Redmond, WA (US); YanWen Qiao, Bothell, WA (US); Kevin Chan, Duvall, WA (US); Stephane Cavin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 15/468,097

(22) Filed: Mar. 23, 2017

(65) Prior Publication Data
US 2018/0278542 A1   Sep. 27, 2018

(51) Int. Cl.
| | |
|---|---|
| G06F 15/173 | (2006.01) |
| G06F 15/16 | (2006.01) |
| H04L 29/08 | (2006.01) |
| H04L 12/911 | (2013.01) |
| H04L 29/12 | (2006.01) |

(52) U.S. Cl.
CPC .......... H04L 67/1036 (2013.01); H04L 47/74 (2013.01); H04L 47/788 (2013.01); H04L 47/822 (2013.01); H04L 61/10 (2013.01)

(58) Field of Classification Search
CPC ..... H04L 47/74; H04L 47/788; H04L 47/822; H04L 67/1036; H04L 67/10
USPC .................................. 709/202–203, 225–226
See application file for complete search history.

(56) References Cited

U.S. PATENT DOCUMENTS

| | | | |
|---|---|---|---|
| 6,016,500 A | 1/2000 | Waldo et al. | |
| 6,917,976 B1 | 7/2005 | Slaughter et al. | |
| 6,950,874 B2 | 9/2005 | Chang et al. | |
| 7,324,452 B2* | 1/2008 | Xu | H04L 47/623 370/236 |
| 7,340,578 B1* | 3/2008 | Khanzode | G06F 3/0605 707/999.2 |
| 8,155,072 B2* | 4/2012 | Warrillow | H04L 47/822 370/330 |

(Continued)

OTHER PUBLICATIONS

Mobach, et al., "Lease-based Decentralized Resource Management in Open Multi-Agent Systems", In Proceedings of the Eighteenth International Florida Artificial Intelligence Research Society Conference, Jan. 2005, 6 pages.

*Primary Examiner* — Bharat Barot
(74) *Attorney, Agent, or Firm* — Michael Best & Friedrich LLP (57) ABSTRACT

Variety of approaches to provide an autonomous governor in a distributed system for preserving a shared resource are described. A hosted service initiates operations to provide the autonomous governor upon determining the shared resource to be managed. An initial lease count is designated to the shared resource. The initial lease count corresponds to an estimated capacity of the shared resource. Next, an assigned lease count is determined by incrementing or decrementing the initial lease count based on a detected actual capacity of the shared resource. Upon detecting a steady state of the assigned lease count, the assigned lease count is incremented to determine whether the actual capacity of the shared resource is increased.

20 Claims, 7 Drawing Sheets

(56) References Cited

U.S. PATENT DOCUMENTS

| | | | |
|---|---|---|---|
| 8,336,054 B2 * | 12/2012 | Cherkasova | G06F 9/4881 709/226 |
| 8,819,239 B2 | 8/2014 | Wu et al. | |
| 9,466,036 B1 * | 10/2016 | Vicaire | H04L 47/70 |
| 2002/0002576 A1 | 1/2002 | Wollrath et al. | |
| 2008/0201459 A1 | 8/2008 | Vul et al. | |
| 2014/0082409 A1 * | 3/2014 | Bae | G06F 11/181 714/4.21 |
| 2014/0325068 A1 * | 10/2014 | Assuncao | H04L 41/082 709/226 |
| 2014/0379922 A1 * | 12/2014 | Xiao | H04L 47/70 709/226 |
| 2016/0043970 A1 | 2/2016 | Jacob et al. | |
| 2016/0085643 A1 | 3/2016 | Mcalister et al. | |
| 2017/0235606 A1 * | 8/2017 | Cherniavsky | G06F 9/5011 718/104 |

* cited by examiner

AUTONOMOUS RESOURCE GOVERNOR IN DISTRIBUTED SYSTEMS FOR PROTECTING SHARED RESOURCES

BACKGROUND

Information exchange have changed processes associated work and personal environments. Automation and improvements in processes have expanded scope of capabilities offered for personal and business data consumption. With the development of faster and smaller electronics, execution of mass processes at cloud systems have become feasible. Indeed, applications provided by data centers, data warehouses, data workstations have become common features in modern personal and work environments. Such systems are managed by a wide variety of applications ranging from enterprise resource management applications to local tracking solutions.

Increasingly, cloud based resources are utilized for variety of services that include processing resource services, memory resource services, data storage services, database services, networking connection services, and/or virtualization services, among others. However, there are currently substantial gaps in controlling operations at resources that provide variety of services for consumption by user(s) and/or other computing device(s). Personnel resources are unnecessarily consumed for management of leases at resources that provide services. Lack of relevant resource management based on lease schemes cause poor management of personnel resources when attempting to optimize resource utilization.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an autonomous governor in a distributed system for preserving a shared resource. A hosted service, according to embodiments, may initiate operations to provide autonomous governor service(s) upon determining the shared resource to be managed. An initial lease count may be designated to the shared resource. The initial lease count may correspond to an estimated capacity of the shared resource. An assigned lease count may be determined by incrementing or decrementing the initial lease count based on a detected actual capacity of the shared resource. Upon detecting a steady state of the assigned lease count, the assigned lease count may be incremented to determine whether the actual capacity of the shared resource is increased.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a hosted service may provide an autonomous governor in a distributed system for preserving a shared resource. In an example scenario, the hosted service may determine a shared resource to be managed. The hosted service may be referred to as the autonomous governor or may include a component that acts as the autonomous governor. The shared resource may include a processing resource, a storage resource, a memory resource, a networking resource, a database resource, and/or a virtualization resource, among others. The shared resource may subscribe to the hosted service for management. Alternatively, the hosted service may seek and add the shared resource for management.

An initial lease count may be designated to the shared resource. The initial lease count may correspond to an estimated capacity of the shared resource. For example, a processing resource may have a number of threads (that may be executed simultaneously) designated as an estimated capacity. The number of threads may be designated as the initial lease count. A lease count as used herein refers to a maximum resource usage (e.g., requests to the resource) and not a current number of leases granted. Thus, increasing the lease count may indicate allowing more usage against the capacity of the resource (and vice versa depreciating the lease count decreases how much capacity of the resource can be consumed). The initial lease count may refer to a number of individual requests that the shared resource may accommodate.

An assigned lease count may be determined by incrementing or decrementing the initial lease count based on a detected actual capacity of the shared resource. The assigned lease count may quantify a number of leases provided by the shared resource to accommodate lease requests by tenants of the shared resource. Tenants may include application(s) and/or other computing device(s). The detected actual capacity may reflect a value that corresponds to a consumed capacity (a number of accommodated requests) subtracted from a maximum capacity (maximum ability to accommodate incoming lease requests).

Upon detecting a steady state of the assigned lease count, a perception of actual capacity to this lease count may be adjusted as a target value such that variations and a tolerance as noted herein are estimated/determined accurately. The steady state may describe a status of the assigned lease count in which a variation in the value of the assigned lease count does not exceed a tolerance. The tolerance may be determined by the hosted service or may be manually configurable. The assigned lease count may be incremented to test whether the shared resource may accommodate additional requests. For example, the shared resource such as a processing resource may accommodate an additional processing thread when a leased thread is not actively consuming the processing resource.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing an autonomous governor in a distributed system for preserving a shared resource. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1:
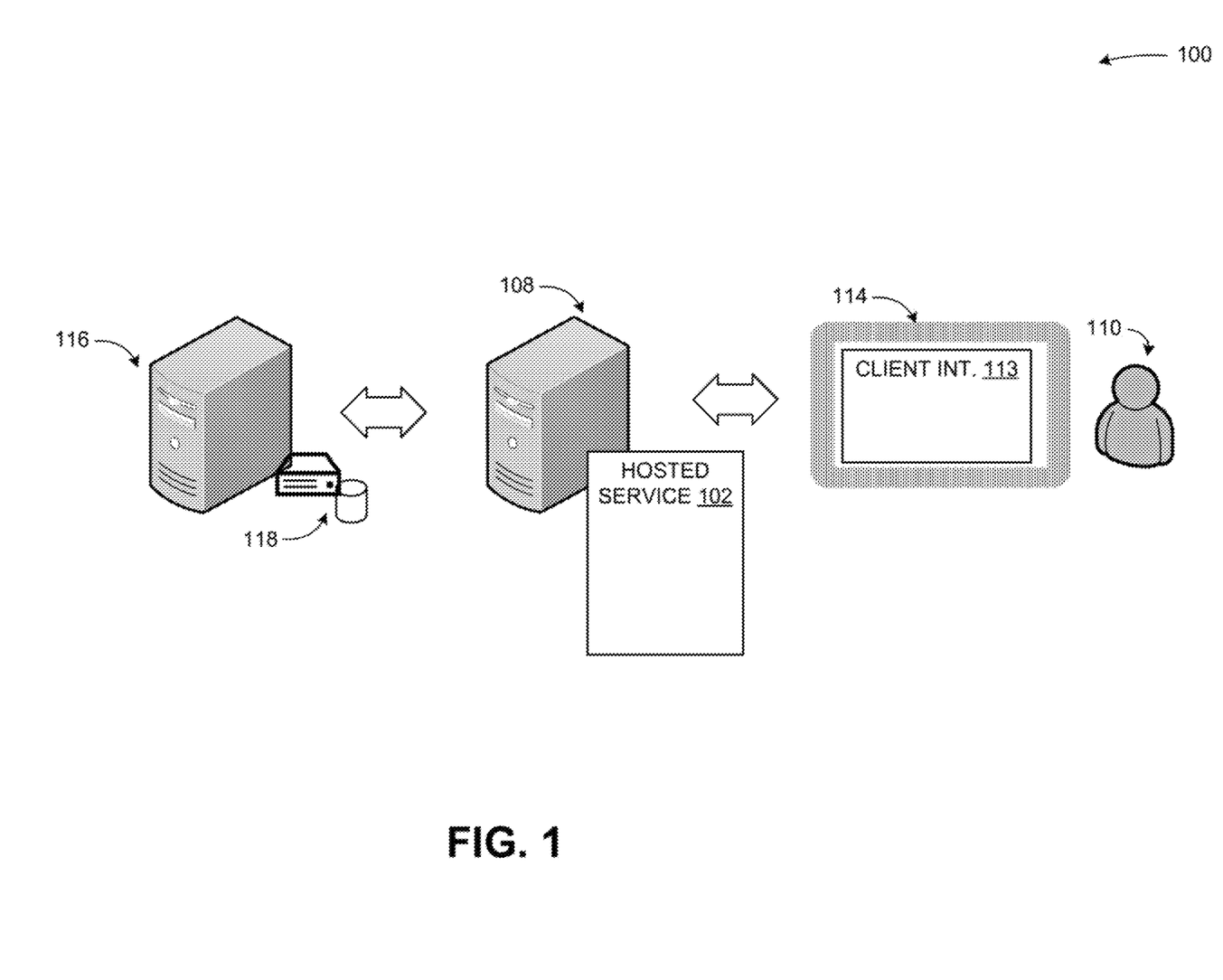
FIG. 1 is a conceptual diagram illustrating examples of providing an autonomous governor in a distributed system for preserving a shared resource, according to embodiments.

FIG. 1 is a conceptual diagram illustrating examples of providing an autonomous governor in a distributed system for preserving a shared resource, according to embodiments.

In a diagram 100, a server 108 may execute (or provide) a hosted service 102. The server 108 may include a physical server providing service(s) and/or application(s) to client devices. A service may include an application performing operations in relation to a client application and/or a subscriber, among others. The server 108 may include and/or is part of a workstation, a data warehouse, a data center, and/or a cloud based distributed computing source, among others.

The server 108 may execute a hosted service 102. The hosted service 102 may initiate operations to provide an autonomous governor upon determining a shared resource 118 to be managed. The hosted service 102 may be referred to as the autonomous governor or may include a component that acts as the autonomous governor. The shared resource 118 may include a processing resource, a storage resource, a memory resource, a networking resource, a database resource, and/or a virtualization resource, among others. The shared resource 118 may be a component of a server 116. Alternatively, the shared resource 118 may be a stand-alone device and/or a virtualization, among others. The shared resource 118 may subscribe to the hosted service 102 for management. Alternatively, the hosted service 102 may seek and add the shared resource 118 for management.

An initial lease count may be designated to the shared resource 118. The initial lease count may correspond to an estimated capacity of the shared resource 118. For example, a processing resource may have an estimated capacity of a number of threads that may be executed simultaneously. The number of threads may be designated as the initial lease count. The initial lease count may refer to a number of individual lease requests that the shared resource may accommodate. In an example implementation, the system may start with an initial estimation of maximum capacity (to handle requests) and an initial lease count of zero, for example. The lease count for the resource may mainly adjust upwards to begin with and may reach a steady state before reaching the estimated maximum, after which the autonomous governor may mainly govern the rate of upward adjustment. The lease count for the resource may not be allowed to exceed the estimated maximum at any state.

An assigned lease count may be determined by incrementing or decrementing the initial lease count based on a detected actual capacity of the shared resource 118. The detected actual capacity may reflect a value that corresponds to a consumed capacity (a number of accommodated requests) subtracted from a maximum capacity (maximum ability to accommodate incoming lease requests).

Upon detecting a steady state of the assigned lease count, the assigned lease count may be incremented to determine whether the actual capacity of the shared resource 118 is increased. The steady state may describe a status of the assigned lease count in which a variation in the value of the assigned lease count does not exceed a tolerance. The tolerance may be determined by the hosted service 102 or may be manually configurable. The assigned lease count may be incremented to test whether the shared resource may accommodate additional requests. For example, the shared resource, such as a processing resource, may accommodate an additional processing thread when a leased thread is not actively consuming the processing resource.

Furthermore, the hosted service 102 may provide a client interface 113 rendered by a client device 114 to a stakeholder 110. The stakeholder 110 may include a user who is authorized to interact with the hosted service 102 through the client interface 113. The hosted service 102 may present status, diagnostics, reporting, and/or configuration, among other functionality associated with the shared resource 118 to the stakeholder 110 through the client interface 113.

The server 108 may communicate with the client device 114, and/or the server 116, through a network. The network may provide wired or wireless communications between network nodes such as the client device 114, the server 108, and/or the server 116, among others. Previous example(s) to provide an autonomous governor are not provided in a limiting sense. Alternatively, the hosted service 102 may manage the shared resource 118 as a desktop application, a workstation application, and/or a server application, among others. The client interface 113 may also include a client application interacting with the hosted service 102.

The stakeholder 110 may interact with the client interface 113 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the server 108, the hosted service 102, embodiments are not limited to these components or system configurations and can be implemented with other system configuration employing fewer or additional components.

Figure 2:
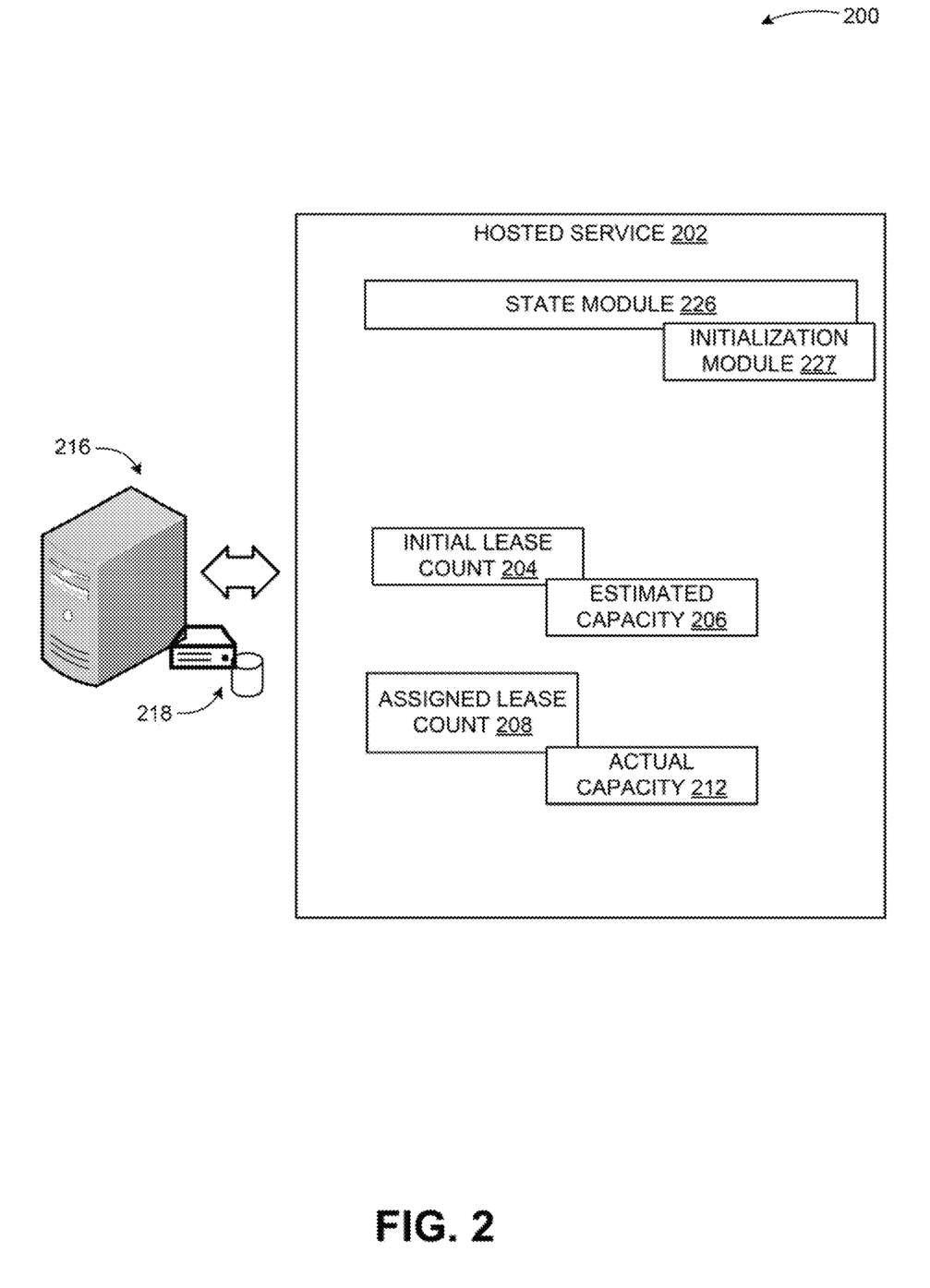
FIG. 2 is a display diagram illustrating example components of a hosted service that provides an autonomous governor in a distributed system for preserving a shared resource, according to embodiments.

FIG. 2 is a display diagram illustrating example components of a hosted service that provides an autonomous governor in a distributed system for preserving a shared resource, according to embodiments.

As illustrated in diagram 200, an initialization module 227 of a hosted service 202 may determine a shared resource 218 to be managed. The shared resource 218 may be a local resource. The shared resource 218 may also include an external resource provided by a server 216. The shared resource 218 may include a memory resource, a processor resource, a data storage resource, a database resource, a virtualization resource, and/or a networking connection resource, among others.

An initial lease count 204 may be designated to the shared resource 218. The initial lease count 204 may correspond to an estimated capacity of the shared resource. For example, the initial lease count 204 may reflect a value that corresponds to a number of requests that the shared resource 218 may accommodate. The initial lease count 204 may be identified from a historical measurement that corresponds to a maximum capacity associated with a related shared resource 218. The maximum capacity may correlate to a highest number of requests that the shared resource 218 (or a related shared resource used as a model) may have accommodated in a previous use scenario (that may include simultaneous accommodation of the incoming lease requests).

An assigned lease count 208 may be determined by incrementing or decrementing the initial lease count 204 based on a detected actual capacity 212 of the shared resource 218. The detected actual capacity may reflect a value that corresponds to a consumed capacity (a number of accommodated requests) subtracted from a maximum capacity (maximum ability to accommodate incoming lease requests).

For example, if the shared resource such, as a networking connection resource, may be designated to have an initial lease count (an estimated number of available networking connections). If the estimated number of available networking connections (reflecting the initial lease count 204) are lower than the actual number of available connections (reflecting an actual capacity 212 of the shared resource 218) then the estimated capacity 206 may be incremented to achieve the actual capacity 212 of the networking connection resource. Alternatively, if the estimated number of available networking connections are higher than the actual number of available connections then the initial lease count 204 may be decremented to result in the assigned lease count 208.

Upon detecting a steady state of the assigned lease count 208, the assigned lease count 208 may be incremented to determine whether the actual capacity 212 of the shared resource 218 is increased. The steady state may describe a status of the assigned lease count 208 in which a variation in the value of the assigned lease count 208 does not exceed a tolerance. The assigned lease count 208 may be incremented to test whether the shared resource may accommodate additional requests. For example, the shared resource 218, such as a data storage resource, may accommodate an additional input/output (I/O) request when a leased I/O connection is not actively consuming the data storage resource.

Figure 3:
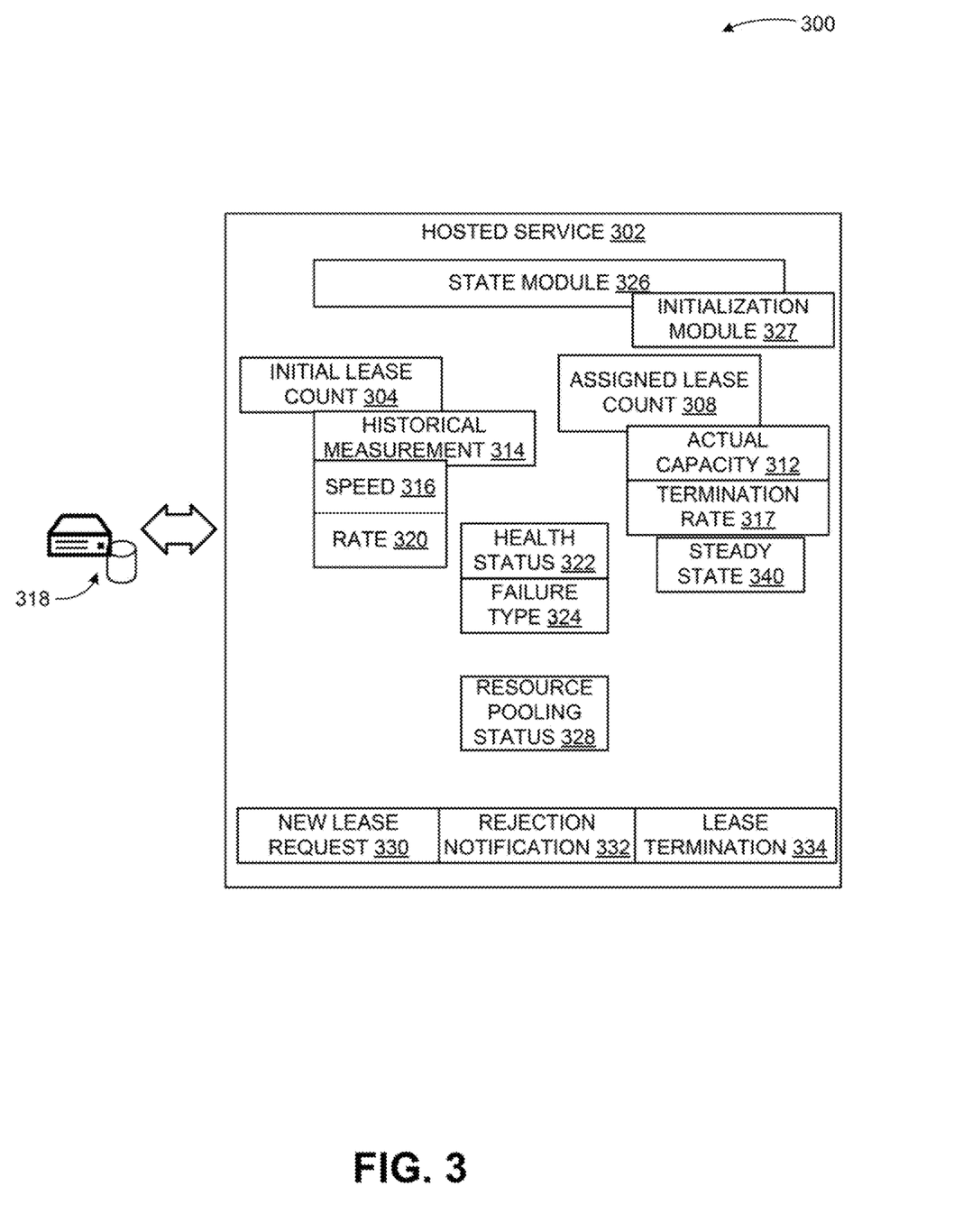
FIG. 3 is a display diagram illustrating components of a scheme to provide an autonomous governor in a distributed system for preserving a shared resource, according to embodiments.

FIG. 3 is a display diagram illustrating components of a scheme to provide an autonomous governor in a distributed system for preserving a shared resource, according to embodiments.

As shown in a diagram 300, a state module 326 and an initialization module 327 of a hosted service 302 may execute operations for preserving a shared resource 318. For example, an initial lease count 304 may be identified from a historical measurement 314 that corresponds to a maximum capacity associated with the shared resource 318. The historical measurement 314 may be tracked by the hosted service 302 and/or requested/retrieved from an external measurement source that tracks the shared resource 318. The maximum capacity may reflect a maximum number of requests that the shared resource 318 may have accommodated simultaneously in a previous use scenario. Alternatively, a related shared resource may be used as a model. A historical measurement 314 associated with the related shared resource may be designated as the initial lease count 304.

In an example scenario, an assigned lease count 308 may be determined by varying a speed 316 of incrementing or decrementing the initial lease count 304. The initial lease count 304 may be incremented or decremented if the actual capacity 312 of the shared resource 318 may be determined to vary from the initial lease count 304. The actual capacity 312 may reflect bow many new lease requests the shared resource 318 may accommodate. The actual capacity 312 may be provided by the shared resource 318 in response to an inquiry or inferred from other criteria such as measurements of consumption associated with the shared resource 318.

The speed 316 of incrementing or decrementing the initial lease count 304 may be varied to measure a response regarding the actual capacity 312 of the shared resource 318. If the response to new lease requests slows (or the shared resource 318 emits errors) then the actual capacity 312 of the shared resource may be interpreted as a value in proximity to the assigned lease count 308. Alternatively, if the response to new lease requests increases (or the shared resource 318 emits fewer errors) then the actual capacity 312 of the shared resource may be interpreted as distant to assigned lease count 308.

In another example scenario, an arrival rate of a new lease request 330 may be compared to a termination rate 317 of assigned leases (quantified by the assigned lease count 308). If the arrival rate is determined to be substantially equal to the termination rate 317 then a steady state 340 of the shared resource 318 may be inferred. The steady state 340 of the shared resource 318 may quantify a status of the shared resource 318 in which a variation of the assigned lease count 308 does not exceed a tolerance. The tolerance may be user configurable or configured by the hosted service 302 based on a variety of criteria associated with the shared resource 318.

The initial lease count 304 may also be decrement as a selected rate 320. The selected rate 320 may be determined based on a health status 322 of the shared resource 318. The health status may include a failure type, a failure rate, and/or a failure frequency, among other criteria associated with the shared resource 318.

Alternatively, the initial lease count 304 may be incremented by the selected rate 320. The selected rate 320 may be determined based on a resource pooling status 328 of the shared resource 318. The resource pooling status 328 may include a number of resources in a same group with the shared resource 318. For example, if other shared resources accommodate the new lease request 330 then the resource pooling status 328 of the shared resource 318 may be designated as underutilized. In such a scenario, the initial lease count 304 may be incremented to prompt the shared resource 318 to accommodate other new lease requests (to replace assigned leases that are terminated). If no other shared resource is available to assign the new lease request 330, the new lease request 330 may be maintained in a queue or discarded.

Furthermore, a rejection notification 332 may be received from the shared resource 318 in response to the new lease request 330. In such a scenario, the new lease request 330 may be assigned to another shared resource. The assigned lease count 308 of the shared resource 318 may be decremented. In response to detecting a lease termination 334 from the shared resource 318, the decrementing of the assigned lease count 308 may be discontinued. Other new lease request(s) may be transmitted to the shared resource 318. The assigned lease count 308 may be incremented in response to a confirmation by the shared resource 318 that describes an accommodation of the other new lease request.

Figure 4:
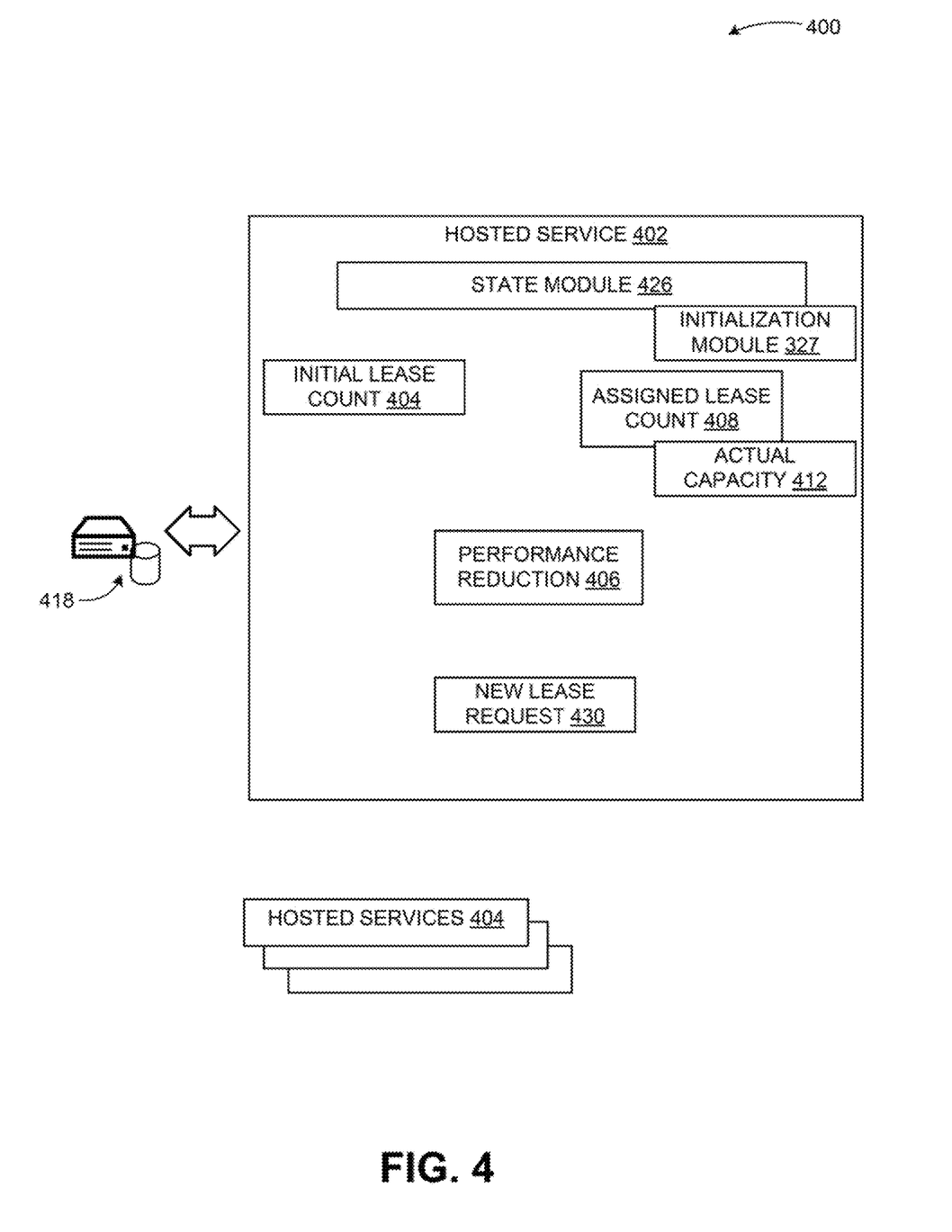
FIG. 4 is a display diagram illustrating an autonomous governor that preserves a shared resource, according to embodiments.

FIG. 4 is a display diagram illustrating an autonomous governor that preserves a shared resource, according to embodiments.

As shown in a diagram 400, a state module 426 and/or an initialization module 427 of a hosted service 402 may manage a shared resource 418 for the hosted service 402 only. Alternatively, the state module 426 and/or the initialization module 427 may manage the shared resource 418 for hosted services 404 that may include the hosted service 402 and/or other hosted service(s).

In another example scenario, a new lease request 430 may be received. The new lease request may include a memory access request, a processing request, a data storage request, an input/output request, a database access request, a virtualization request, and/or a networking connection request, similar ones. The new lease request 430 may be transmitted to the shared resource 418. An assigned lease count 408 may be incremented.

In other example scenario(s), an information associated with a performance reduction 406 at the shared resource 418 may be received. In response, the assigned lease count 408 may be decremented to represent a decreased capacity of the shared resource 418 (because of error(s) and/or other problem(s) at the shared resource 418). The decreased capacity may correspond to an actual capacity 412 of the shared resource 418. The actual capacity 412 of the shared resource 418 may be impacted by a steady state policy, a request increase policy, and/or an error decrease policy, among others associated with the shared resource 418. The variety of the policy(s) impacting the shared resource 418 may be defined by an or manager (computing device and/or person(s)).

An initial maximum lease count may be allowed so that growth of leases to a resource that is assumed to be initially healthy is not throttled (i.e. during warm-up). When the autonomous governor is asked to grant a new lease to the resource, if increasing the current lease count exceeds the maximum lease count allowed, the autonomous governor may decide whether or not to grant the request based on the current state of the resource and the policy for that state. For example, a resource in warm-up state may be allowed to immediately increase the maximum lease count. A resource in steady state may be allowed to increase the lease count (e.g., by 5 every 10 seconds). A resource in probation state may not be allowed to increase the maximum lease count at all (e.g., for 30 seconds). A resource in throttle state may only be allowed to increase maximum lease count for that resource (or a pool of resources) subject to limitations (e.g., once every 30 seconds).

There may be different policies controlling the behavior around growth or decline of leases by the autonomous governor for each state (healthy, probation, throttle etc.). The policy(ies) may also indicate if the autonomous governor may control lease growth/decline per individual resource or a pool of resources that share some infrastructure (for example, servers sharing the same networking layer). By evaluating responses from the resource against the current policy and time in state, the autonomous governor may make decisions about which state to place the resource. The model described herein may lend itself to automatic detection of resource health and adjustment of load such that the system operates at the maximum allowed utilization of the resource or pool of resources for any given state (whether the resource is healthy or in a degraded state).

As discussed above, the hosted service may be employed to perform operations to automate a preservation of a shared resource by an autonomous governor. An increased performance and efficiency improvement with the hosted service 102 may occur as a result of processing a lease count associated with a shared resource based on capacity of the shared resource. Additionally, a steady state analysis to improve an accommodation of a lease request at the shared resource, by the hosted service 102, may reduce processor load, increase processing speed, conserve memory, and reduce network bandwidth usage.

Embodiments, as described herein, address a need that arises from a lack of efficiency to provide an autonomous governor in a distributed system for preserving a shared resource. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing an autonomous governor in a distributed system for preserving a shared resource may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
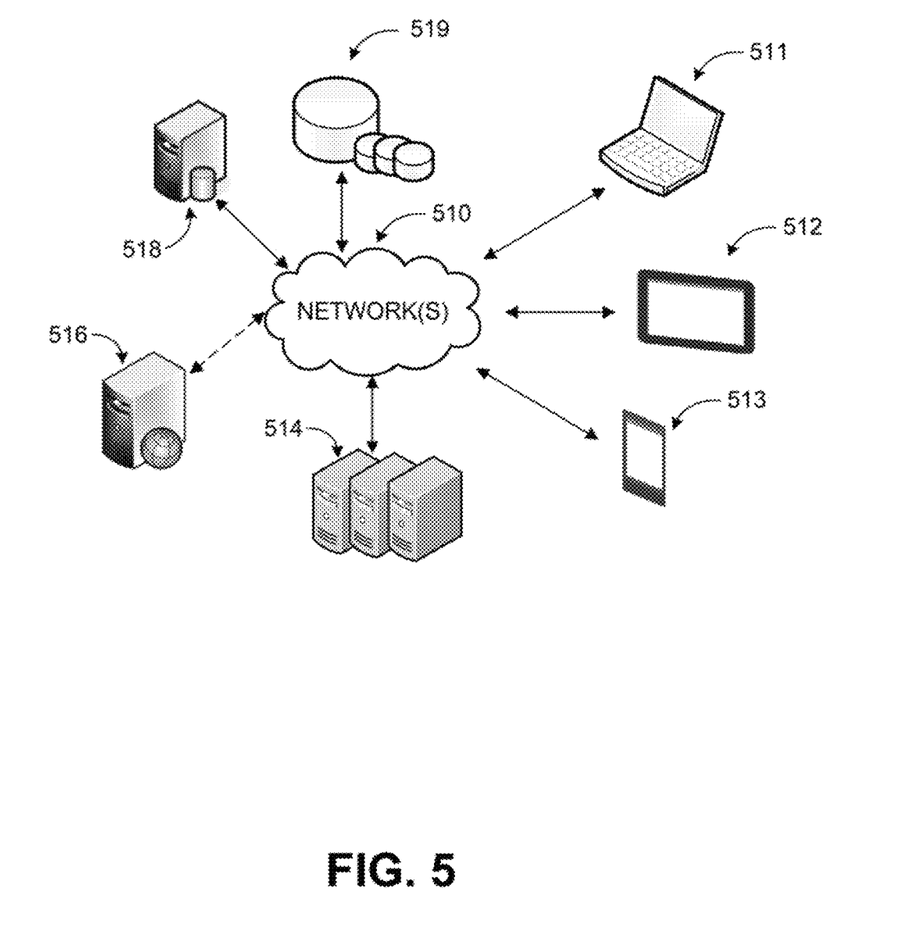
FIG. 5 is a simplified networked environment, where a system according to embodiments may be implemented.

FIG. 5 is an example networked environment, where embodiments may be implemented. A hosted service configured to provide an autonomous governor may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A hosted service may determine the shared resource to be managed. Next, an initial lease count may be designated to the shared resource. The initial lease count may correspond to an estimated capacity of the shared resource. An assigned lease count may be determined by incrementing or decrementing the initial lease count based on a detected actual capacity of the shared resource. Upon detecting a steady state of the assigned lease count, the assigned lease count may be incremented to determine whether the actual capacity, of the shared resource is increased. The hosted service may store data associated with the shared resource in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide an autonomous governor in a distributed system for preserving a shared resource. Furthermore, the networked environments discussed in FIG. 5 are for illustration purposes only. Embodiments are not limited to the example applications, modules, or processes.

Figure 6:
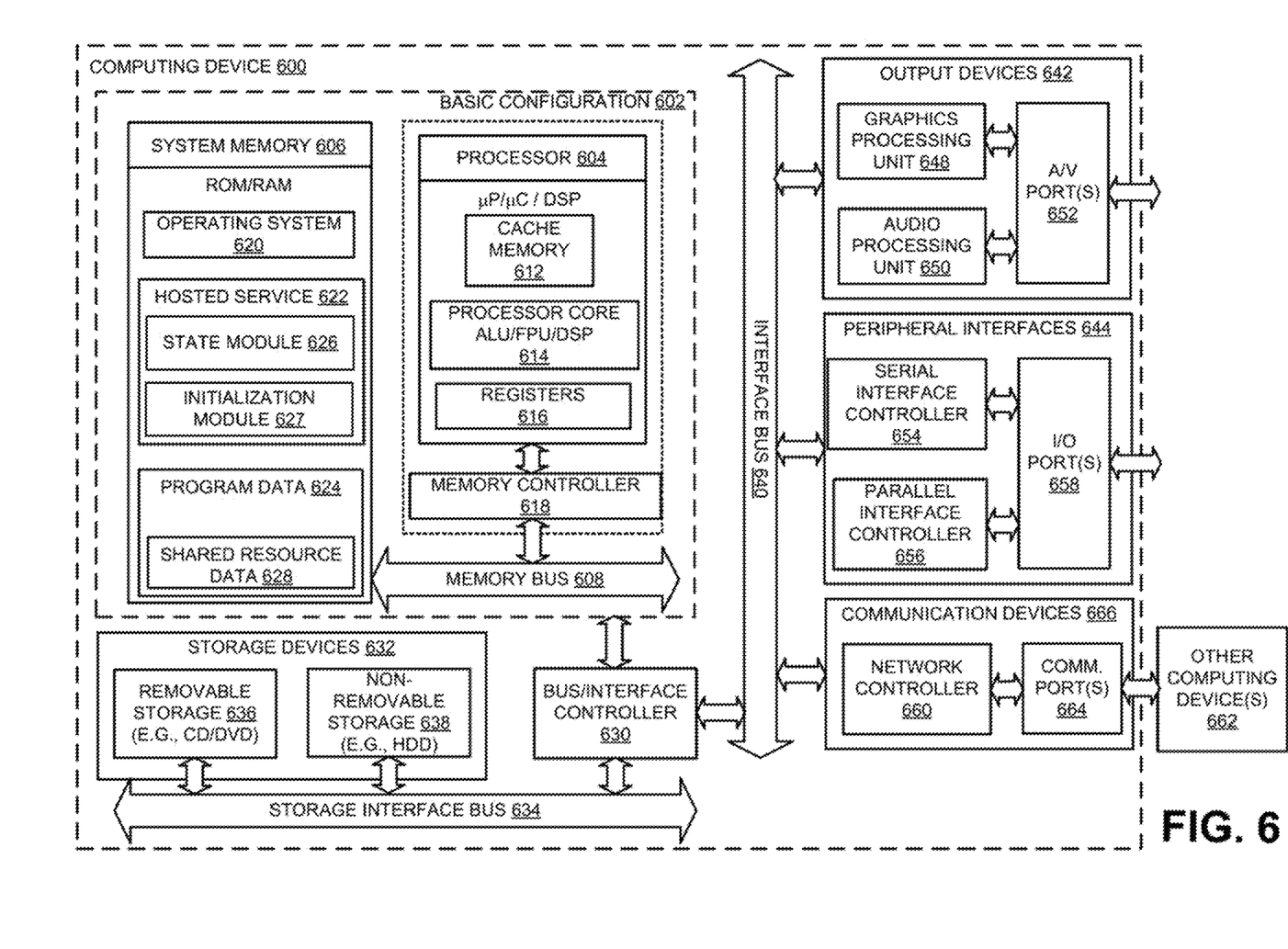
FIG. 6 is a block diagram of an example computing device, which may be used to provide an autonomous governor in a distributed system for preserving a shared resource, according to embodiments.

FIG. 6 is a block diagram of an example computing device, which may be used to provide an autonomous governor in a distributed system for preserving a shared resource, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), a graphics processing unit (GPU), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a hosted service 622, and a program data 624. The hosted service 622 may include components such as a state module 626 and an initialization module 627. The state module 626 and the initialization module 627 may execute the processes associated with the hosted service 622. The initialization module 627 may determine the shared resource to be managed. Next, an initial lease count may be designated to the shared resource. The initial lease count may correspond to an estimated capacity of the shared resource. The state module 626 may determine an assigned lease count by incrementing or decrementing the initial lease count based on a detected actual capacity of the shared resource. Upon detecting a steady state of the assigned lease count, the assigned lease count may be incremented to determine whether the actual capacity of the shared resource is increased.

Input to and output out of the hosted service 622 may be transmitted through a communication module associated with the computing device 600. An example of the communication module may include a communication device 666 that may be communicatively coupled to the computing device 600. The communication module may provide wired and/or wireless communication. The program data 624 may also include, among other data, shared resource data 628, or the like, as described herein. The shared resource data 628 may include an initial lease count, and/or an assigned lease count, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs) optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interlace controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged, to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulate data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations. Additionally, the computing device 600 may include specialized hardware such as an application-specific integrated circuit (ASIC), a field programmable gate array (FPGA), a programmable logic device (PLD), and/or a free form logic, on an integrated circuit (IC), among others.

Example embodiments may also include methods to provide an autonomous governor in a distributed system for preserving a shared resource. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
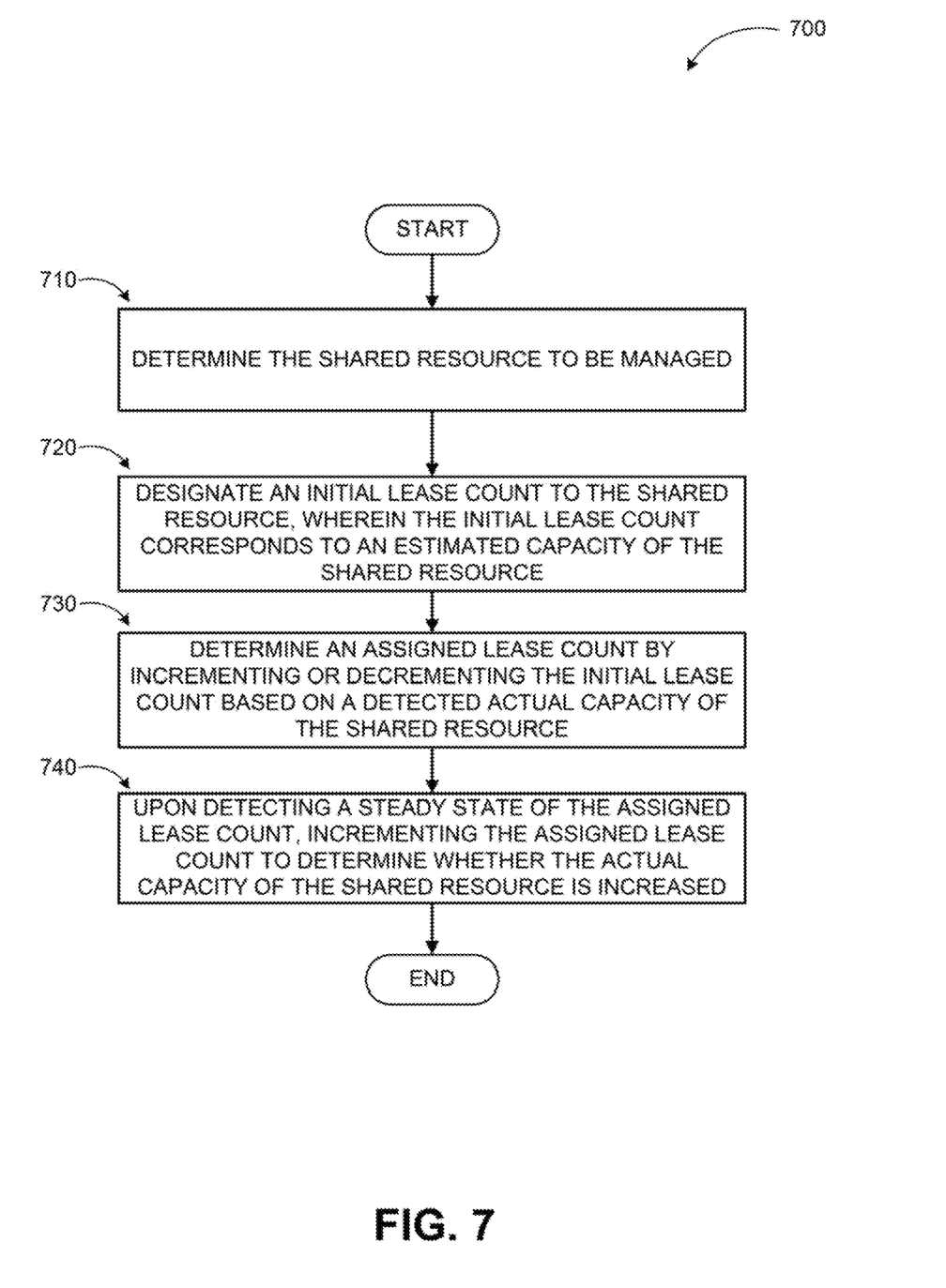
FIG. 7 is a logic flow diagram illustrating a process for providing an autonomous governor in a distributed system for preserving a shared resource, according to embodiments.

FIG. 7 is a logic flow diagram illustrating a process for providing an autonomous governor in a distributed system for preserving a shared resource, according to embodiments. Process 700 may be implemented on a computing device, such as the computing device 600 or another system.

Process 700 begins with operation 710, where the hosted service may determine a shared resource to be managed. The shared resource may include a processing resource, a storage resource, a memory resource, a networking resource, a database resource, and/or a virtualization resource, among others. At operation 720, an initial lease count may be designated to the shared resource. The initial lease count may correspond to an estimated capacity of the shared resource.

At operation 730, an assigned lease count may be determined by incrementing or decrementing the initial lease count based on a detected actual capacity of the shared resource. The assigned lease count may refer to a number of lease requests accommodated by the shared resource. Upon detecting a steady state of the assigned lease count, the assigned lease count may be incremented to determine whether the actual capacity of the shared resource is increased at operation 740.

The operations included in process 700 is for illustration purposes. Providing an autonomous governor in a distributed system for preserving a shared resource may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing an autonomous governor in a distributed system for preserving a shared resource is described. The means may include a means for determining the shared resource to be managed; a means for designating an initial lease count to the shared resource, where the initial lease count corresponds to an estimated initial capacity of the shared resource; a means for determining an assigned lease count by incrementing or decrementing the initial lease count based on a detected actual capacity of the shared resource; and a means for incrementing the assigned lease count to determine whether the actual capacity of the shared resource is increased upon detecting a steady state of the assigned lease count.

According to some examples, a method executed on a computing device to provide an autonomous governor in a distributed system for preserving a shared resource is described. The method may include determining the shared resource to be managed; designated an initial lease count to the shared resource, where the initial lease count corresponds to an estimated initial capacity of the shared resource; determining an assigned lease count by incrementing or decrementing the initial lease count based on a detected actual capacity of the shared resource; and upon detecting a steady state of the assigned lease count, incrementing the assigned lease count to determine whether the actual capacity of the shared resource is increased.

According to other examples, the method may further include identifying the initial lease count from a historical measurement that corresponds to a maximum capacity associated with the shared resource. The method may also include identifying the initial lease count from a historical measurement that corresponds to a maximum capacity associated with a related shared resource. Determining the assigned lease count by incrementing or decrementing the initial lease count may include varying a speed of incrementing or decrementing the initial lease count. Detecting the steady state of the assigned lease count may include comparing an arrival rate of new lease requests to a termination rate of assigned leases and determining the arrival rate to be substantially equal the termination rate.

According to further examples, the method may also include decrementing the initial lease count at a selected rate, where the selected rate is determined based on a health status of the shared resource. The health status may include a failure type. The method may further include incrementing the initial lease count at a selected rate, where the selected rate is determined based on a resource pooling status of the shared resource. The resource pooling status may include a number of resources in a same group with the shared resource.

According to yet other examples, the method may include receiving a rejection notification from the shared resource in response to a new lease request; assigning the new lease request to another shared resource; and decrementing the assigned lease count of the shared resource. The method may further include detecting a lease termination from the shared resource; discontinuing the decrementing of the assigned lease count; transmitting other new lease request to the shared resource; and incrementing the assigned lease count. The method may also include detecting an unavailability of other shared resource to assign the new lease request; and one of maintaining the new lease request in a queue and discarding the new lease request.

According to other examples, a server configured to provide an autonomous governor in a distributed system for preserving a shared resource is described. The server may include a communication module configured to facilitate communication between a hosted service and one or more client devices; a memory configured to store instructions; and a processor coupled to the memory and the communication module. The processor may execute the hosted service in conjunction with the instructions stored in the memory, where the hosted service may include an initialization module configured to determine the shared resource to be managed, where the shared resource includes one or more of a memory, a processor, a data storage, a database, a virtualization, and a networking connection; estimate an initial lease count from a history of the shared resource or other shared resources, where the initial lease count corresponds to an estimated capacity of the shared resource. The hosted service may also include a state module configured to determine an assigned lease count by incrementing or decrementing the initial lease count based on a detected actual capacity of the shared resource; and upon detecting a steady state of the assigned lease count, increment the assigned lease count to determine whether the actual capacity of the shared resource is increased.

According to some examples, the state module may be further configured to manage the shared resource for the hosted service only or manage the shared resource for a plurality of hosted services. The state module may also be configured to receive a new lease request that includes one of: a memory access request, a processing request, a data storage request, an input/output request, a database access request, a virtualization request, and a networking connection request; transmit the new lease request to the shared resource; and increment the assigned lease count. The state module may be further configured to receive an information associated with a performance reduction at the shared resource; and decrement the assigned lease count. The detected actual capacity of the shared resource may be impacted based on one or more of a steady state policy, a request increase policy, and an error decrease policy.

According to further examples, a computer-readable memory device with instructions stored thereon to provide an autonomous governor in a distributed system for preserving a shared resource is described. The instructions may include determining the shared resource to be managed, where the shared resource includes one or more of a memory, a processor, a data storage, a database, a virtualization, and a networking connection; estimating an initial lease count from a history of the shared resource or other shared resources, where the initial lease count corresponds to an estimated capacity of the shared resource; determining an assigned lease count by incrementing or decrementing the initial lease count based on a detected actual capacity of the shared resource; and upon detecting a steady state of the assigned lease count, incrementing the assigned lease count to determine whether the actual capacity of the shared resource is increased.

According to other examples, the instructions may further include receiving a rejection notification from the shared resource in response to a new lease request; assigning the new lease request to another shared resource; decrementing the assigned lease count of the shared resource; detecting a lease termination from the shared resource; discontinuing the decrementing of the assigned lease count; transmitting the new lease request to the shared resource; and incrementing the assigned lease count.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide an autonomous governor in a distributed system for preserving a shared resource, the method comprising:
   determining the shared resource to be managed;
   designating an initial lease count to the shared resource, wherein the initial lease count corresponds to an estimated initial capacity of the shared resource;
   determining an assigned lease count of the shared resource by incrementing or decrementing the initial lease count based on a comparison of the initial lease count and a detected actual capacity of the shared resource; and
   upon detecting a steady state of the assigned lease count, incrementing the assigned lease count to determine whether the actual capacity of the shared resource is increased.

2. The method of claim 1, further comprising:
   identifying the initial lease count from a historical measurement that corresponds to a maximum capacity associated with the shared resource.

3. The method of claim 1, further comprising:
   identifying the initial lease count from a historical measurement that corresponds to a maximum capacity associated with a related shared resource.

4. The method of claim 1, wherein determining the assigned lease count of the shared resource by incrementing or decrementing the initial lease count comprises:
   varying a speed of incrementing or decrementing the initial lease count.

5. The method of claim 1, wherein detecting the steady state of the assigned lease count comprises:
   comparing an arrival rate of new lease requests to a termination rate of assigned leases; and
   determining the arrival rate to be substantially equal to the termination rate.

6. The method of claim 1, further comprising:
   decrementing the initial lease count at a selected rate, wherein the selected rate is determined based on a health status of the shared resource.

7. The method of claim 6, wherein the health status includes a failure type.

8. The method of claim 1, further comprising:
   incrementing the initial lease count at a selected rate, wherein the selected rate is determined based on a resource pooling status of the shared resource.

9. The method of claim 8, wherein the resource pooling status includes a number of resources in a same group with the shared resource.

10. The method of claim 1, further comprising:
    receiving a rejection notification from the shared resource in response to a new lease request;
    assigning the new lease request to another shared resource; and
    decrementing the assigned lease count of the shared resource.

11. The method of claim 10, further comprising:
    detecting a lease termination from the shared resource;
    discontinuing the decrementing of the assigned lease count;
    transmitting another new lease request to the shared resource; and
    incrementing the assigned lease count.

12. The method of claim 10, further comprising:
    detecting an unavailability of another shared resource to assign the new lease request; and
    one of maintaining the new lease request in a queue and discarding the new lease request.

13. A server configured to provide an autonomous governor in a distributed system for preserving a shared resource, the server comprising:
    a memory configured to store instructions; and
    a processor coupled to the memory and the communication module, the processor configured to:
        determine the shared resource to be managed, wherein the shared resource includes one or more of a memory, a processor, a data storage, a database, a virtualization, and a networking connection;
        estimate an initial lease count from a history of the shared resource or another shared resources, wherein the initial lease count corresponds to an estimated capacity of the shared resource;
        determine an assigned lease count of the shared resource by incrementing or decrementing the initial lease count based on a comparison of the initial lease count and a detected actual capacity of the shared resource; and
        upon detecting a steady state of the assigned lease count, increment the assigned lease count to determine whether the actual capacity of the shared resource is increased.

14. The server of claim 13, wherein the processor is further configured to:
    manage the shared resource for a hosted service only.

15. The server of claim 13, wherein the processor is further configured to:
    manage the shared resource for a plurality of hosted services.

16. The server of claim 13, wherein the processor is further configured to:
    receive a new lease request that includes one of: a memory access request, a processing request, a data storage request, an input/output request, a database access request, virtualization request, and a networking connection request;
    transmit the new lease request to the shared resource; and
    increment the assigned lease count.

17. The server of claim 13, wherein the processor state module is further configured to:
    receive an information associated with a performance reduction at the shared resource; and
    decrement the assigned lease count.

18. The server of claim 13, wherein the detected actual capacity of the shared resource is impacted based on one or more of a steady state policy, a request increase policy, and an error decrease policy.

19. A computer-readable memory device with instructions stored thereon to provide an autonomous governor in a distributed system for preserving a shared resource, the instructions comprising:
    determining the shared resource to be managed, wherein the shared resource includes one or more of a memory, a processor, a data storage, a database, a virtualization, and a networking connection;

estimating an initial lease count from a history of the shared resource or another shared resources, wherein the initial lease count corresponds to an estimated capacity of the shared resource;

determining an assigned lease count of the shared resource by incrementing or decrementing the initial lease count based on a comparison of the initial lease count and a detected actual capacity of the shared resource; and upon detecting a steady state of the assigned lease count, incrementing the assigned lease count to determine whether the actual capacity of the shared resource is increased.

20. The computer-readable memory device of claim 19, wherein the instructions further comprise:

receiving a rejection notification from the shared resource in response to a new lease request;

assigning the new lease request to another shared resource;

decrementing the assigned lease count of the shared resource;

detecting a lease termination from the shared resource;

discontinuing the decrementing of the assigned lease count;

transmitting the new lease request to the shared resource; and incrementing the assigned lease count.

* * * * *